Figure 1:
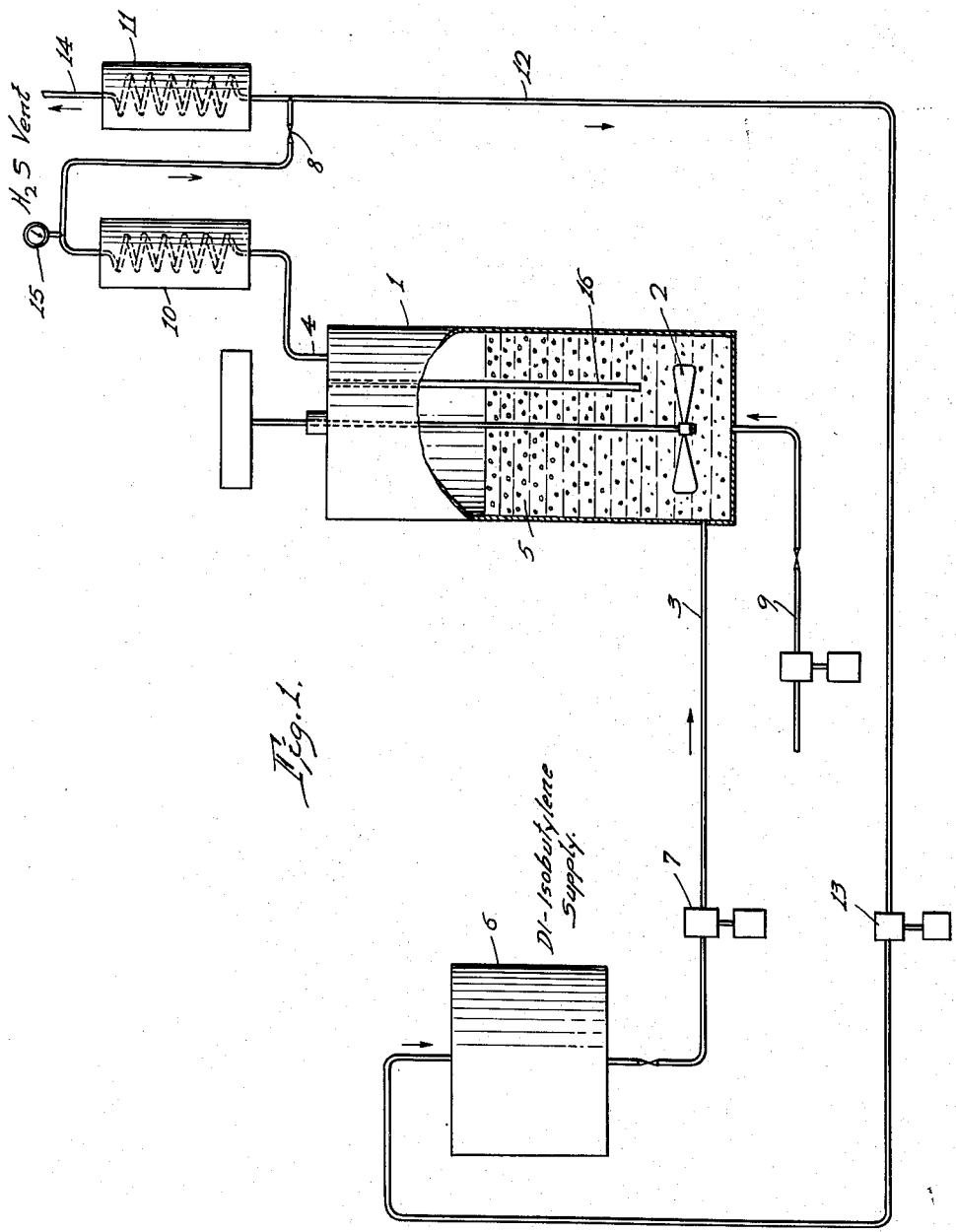

Nov. 10, 1953   D. R. STEVENS ET AL   2,658,900
SULFURIZATION OF DI-ISOBUTYLENE
Filed Feb. 15, 1951   3 Sheets-Sheet 1

INVENTORS.
Donald R. Stevens and
Samuel C. Camp.
BY
their ATTORNEY

Nov. 10, 1953     D. R. STEVENS ET AL     2,658,900
SULFURIZATION OF DI-ISOBUTYLENE

Filed Feb. 15, 1951     3 Sheets-Sheet 2

Patented Nov. 10, 1953

2,658,900

UNITED STATES PATENT OFFICE 2,658,900

SULFURIZATION OF DI-ISOBUTYLENE

Donald R. Stevens, Wilkinsburg, and Samuel C. Camp, Gibsonia, Pa., assignors to Gulf Research & Development Company, Pittsburgh, Pa., a corporation of Delaware Application February 15, 1951, Serial No. 211,078

6 Claims. (Cl. 260—327)

This invention relates to the sulfurization of di-isobutylene and more particularly to an improved process for preparing a sulfurization product of di-isobutylene comprising compounds having the empirical formula $C_8H_{12}S_3$ by the reaction of di-isobutylene with sulfur.

A method of preparing a sulfurized product comprising compounds having the empirical formula $C_8H_{12}S_3$ by reacting di-isobutylene and sulfur in closed vessels is disclosed in U. S. Patent No. 2,535,705 to Stevens and Starnes. The present invention provides an improved process for carrying out the known reactions by which higher yields of the desired sulfurized products are obtained with more economical use of di-isobutylene.

The desired products of our invention comprise two isomeric compounds having the empirical formula $C_8H_{12}S_3$. One of these isomers is an orange-colored crystalline solid having a melting point of about 87° C. and the other is a yellowish-orange crystalline solid having a melting point of about 80° C. The desired product may comprise either of these compounds alone or a mixture of them or the crude sulfurization product of which these isomers are constituents. The isomer having the higher melting point is believed to be 4-neopentyl-1,2-dithia-4-cycyopentene-3-thione having the structural formula:

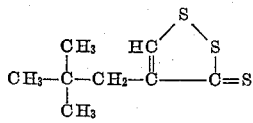

The isomer having the lower melting point is believed to be 4-methyl-5-tert-butyl-1,2-dithia-4-cyclopentene-3-thione having the structural formula:

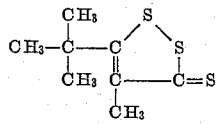

These products of our process have a number of important uses, among which may be mentioned their utility as chemical intermediates in the preparation of organic acids and as valuable additives for certain hydrocarbon fuels and cutting oils. The crude sulfurization product containing one or both of the isomers is a valuable component of superior cutting oils and is also useful as a cetane number improver for diesel fuels.

The equation for the sulfurization of di-isobutylene which produces the products of our invention is $C_8H_{16}+5S \rightarrow C_8H_{12}S_3+2H_2S$. Thus it may be seen that hydrogen sulfide is formed in the reaction. We have discovered that the hydrogen sulfide has an important effect on the course of the reaction. The hydrogen sulfide can react with unreacted di-isobutylene charge according to the following equation:

$$C_8H_{16}+H_2S \rightarrow C_8H_{17}SH$$

thus forming undesirable mercaptans and lowering the yield of the desired $C_8H_{12}S_3$ products by consuming some of the di-isobutylene charge. Also the mercaptans so produced can react with unreacted sulfur

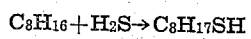

forming undesirable disulfides and polysulfides and also lowering the yield of the desired product by consuming a portion of the sulfur.

Our invention comprises a process for sulfurizing di-isobutylene in which the undesirable side reactions described above are largely avoided and the desired products are obtained in very high yields and high purity. In accordance with our invention in sulfurizing di-isobutylene the di-isobutylene is charged beneath the surface of a liquid reaction mass comprising molten sulfur, and hydrogen sulfide formed in the resulting reaction is removed from contact with the reaction mass substantially as rapidly as formed.

In a more specific embodiment our invention in sulfurizing di-isobutylene comprises charging di-isobutylene beneath the surface of a liquid reaction mass comprising molten sulfur maintained at a temperature of between about 200° and 230° C. and a pressure of between about 25 and 120 pounds per square inch whereby hydrogen sulfide is formed in the resulting reaction and removing hydrogen sulfide from contact with the reaction mass substantially as rapidly as formed.

Figure 2:
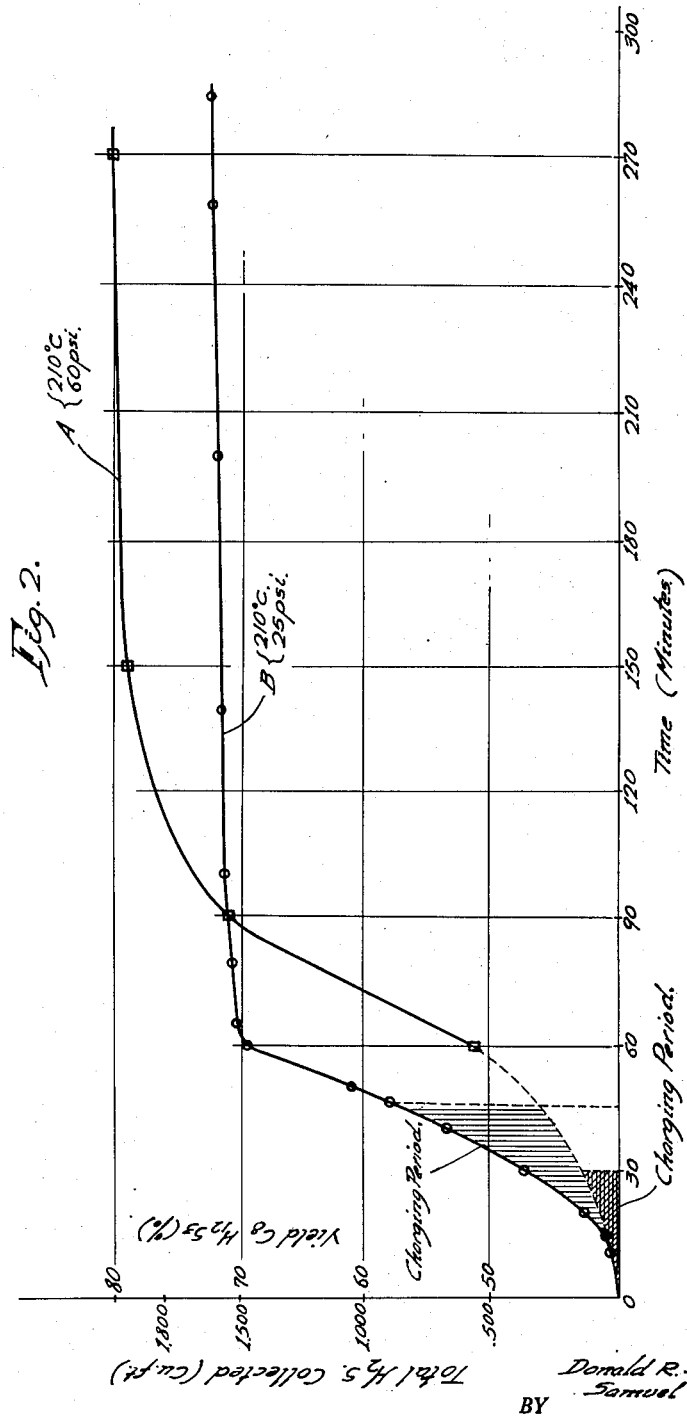
Figure 3:
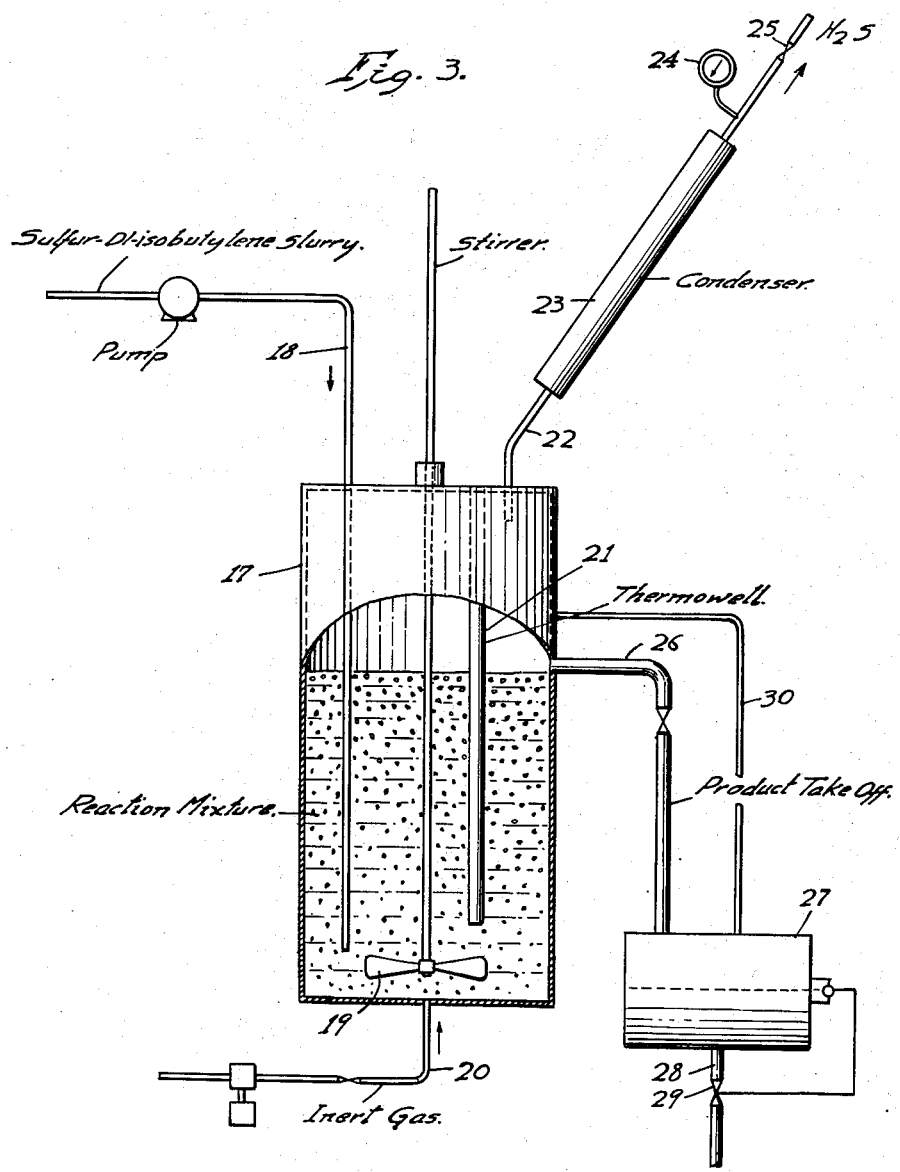

Our invention will be further described with reference to the accompanying drawings in which:

Figure 1 shows diagrammatically one form of apparatus suitable for use with our process, Figure 2 shows curves which plot data obtained in test runs of our process, and Figure 3 shows diagrammatically a modified form of apparatus suitable for use with our process.

Referring to Figure 1 of the drawing, there is shown a reaction vessel 1 provided with a stirrer 2, a feed inlet 3 located near the lower end of the reaction vessel, and a gas outlet 4 located near the upper end of the reaction vessel. In a preferred embodiment of our process, reaction vessel 1 is charged with a mass of sulfur 5 which is heated by heating means not shown in the drawing to a molten state and is maintained at a temperature of preferably between about 200° and 230° C. during the reaction. Di-isobutylene is pumped from supply tank 6 through pump 7 and line 3 into the reaction vessel beneath the surface of the mass of molten sulfur therein. The di-isobutylene may be preheated before charging to the reaction vessel if desired, and if so a preheater can conveniently be placed between pump 7 and the reaction vessel. Agitation of the reaction mass is provided by stirrer 2 to insure proper contact and distribution of the reactants. The initial pressure in the reactor may be atmospheric or super-atmospheric, but preferably should be sufficient to maintain the di-isobutylene in the liquid state.

Upon contact between the di-isobutylene and molten sulfur under these conditions, reaction occurs predominantly accordingly to the equation $C_8H_{16} + 5S \rightarrow C_8H_{12}S_3 + 2H_2S$. The hydrogen sulfide formed bubbles upwardly through the molten sulfur. Valve 8 in line 4 is kept closed until a desired pressure of between about 25 and 120 pounds per square inch gage is built up within the reactor. (When pressures are referred to in the specification and claims, it will be understood that gage pressures are intended unless otherwise indicated.) When this desired pressure of between about 25 and 120 pounds per square inch is obtained, valve 8 is opened to release at least part of the hydrogen sulfide from reaction vessel 1 through line 4 and to maintain the pressure in the reaction vessel at the desired point. As a result of the release of hydrogen sulfide from the reaction vessel and introduction of the di-isobutylene beneath the surface of the sulfur, contact between the unreacted di-isobutylene and hydrogen sulfide is kept to a desired minimum. Consequently there is little or no lowering of yield and purity of product caused by side reactions of the hydrogen sulfide.

To further reduce the contact between the hydrogen sulfide and the di-isobutylene, the hydrogen sulfide may be swept out of the reaction mass by an inert gas such as nitrogen, carbon dioxide, etc., which may be blown into the bottom reactor 1 through line 9. Passing an inert gas through the reaction mass helps remove hydrogen sulfide from the reaction mass and also provides a relatively high partial pressure of inert gas above the reaction mass thus considerably diminishing the opportunity for reaction between the di-isobutylene and hydrogen sulfide.

The hydrogen sulfide removal line 4 can be provided with a condenser between the reaction vessel 1 and the pressure control valve 8 such as condenser 10 shown in the drawing. Di-isobutylene carried along by the hydrogen sulfide gas is condensed in this condenser 10 under the reaction pressure and flows back into the reactor 1.

Another condenser can be provided beyond valve 8 such as condenser 11 shown in the drawing to condense any di-isobutylene remaining in the hydrogen sulfide gas. Di-isobutylene condensed in condenser 11 can be returned to the di-isobutylene supply tank through line 12 and pump 13 while hydrogen sulfide is vented to the atmosphere or passed to suitable collecting means through line 14.

The reaction system is provided with suitable means for measuring temperature and pressure. Thus, as shown in the drawing, a pressure gage 15 is installed in the line between condenser 10 and valve 8 and the reactor 1 is provided with a thermal well 16 containing temperature-measuring means, not shown.

An amount of di-isobutylene somewhat in excess of the stoichiometric amount of 1 mol per 5 mols of sulfur is charged to the reactor 1 over a charging period the length of which is governed by several considerations. The lower limit for the length of this charging period is determined by the practical limitations on the rate at which the particular amount of di-isobutylene may be charged for any particular diameter feed inlet, any particular pump size, etc. Also the charging period must be of sufficient length to avoid vaporizing di-isobutylene from the hot reaction mass which might occur if the rate of charging is too rapid. The maximum length for the charging period is governed by the desirability of completing the reaction as rapidly as possible for the particular conditions of temperature and pressure. Thus the di-isobutylene should be added to the reactor at least substantially as rapidly as it is consumed in the reaction although if for any reason it is not an object to finish the reaction as rapidly as possible the di-isobutylene may be added as slowly as desired. A charging period of from about 10 to about 60 minutes has proved to be very satisfactory when conducting the process under conditions comparable to those recited in the example described below. However, a longer or shorter charging period may be used, bearing in mind the various considerations mentioned above.

The reaction between di-isobutylene and sulfur under the conditions of our process is relatively slow and consequently the reactants should be maintained in contact for a period after the charging of di-isobutylene is completed in order to allow the reaction to go to completion and obtain the maximum yield of the desired product. In general, it may be said that the yield of the desired $C_8H_{12}S_3$ products increases as the length of the reaction period is increased. However, we have found that after a certain length of time the increase in yield for any given additional length of time becomes so small that the expenditure of time is not sufficiently repaid by increase in yield. This condition is illustrated graphically by curve A in Figure 2 of the drawing.

Curve A plots the reaction time in minutes against the yield of $C_8H_{12}S_3$ in per cent. The data were obtained by sulfurizing di-isobutylene according to our process at a temperature of 210° C. and a pressure of 60 pounds per square inch in a manner similar to that described in the example below. In the tests on which curve A is based, there was a 30-minute period for charging di-isobutylene, and the reaction was permitted to continue for a total of 240 minutes after the end of the charging period. From curve A it is seen that the yield increases continually for about 150 minutes. After this time the increase in yield becomes slight and usually it would not be profitable to continue the reaction much beyond this 150-minute period which is 120 minutes after the 30-minute charging period used in these tests.

The length of the reaction period following the charging period will, of course, depend to some extent upon the length of the charging period.

Thus if the charging period is very long most of the di-isobutylene in the reactor will have already been in contact with the sulfur for a long period of time before the charging period is completed and therefore the additional time after the end of the charging period for allowing the sulfur and di-isobutylene to react may be correspondingly shortened. Likewise if the charging period is short, the reaction period following the charging period must be correspondingly lengthened to obtain the maximum yield.

During the reaction period hydrogen sulfide is formed at a varying rate. Thus, during the first part of the reaction period while di-isobutylene is being charged, the rate of formation of hydrogen sulfide is fairly slow but becomes steadily more rapid and sometime after the charging of di-isobutylene is completed it reaches a maximum point after which it decreases sharply. The sharp decrease in the rate of hydrogen sulfide formation does not, however, indicate that complete reaction has occurred. A considerable increase in the $C_8H_{12}S_3$ products is obtained by allowing the reaction to continue after the rate of hydrogen sulfide formation decreases sharply. This characteristic of the reaction is illustrated in curve B of Figure 2.

In curve B the length of the reaction period in minutes is plotted against the cumulative volume of hydrogen sulfide released from the reaction vessel during the process. Curve B is based on data obtained in the sulfurization of di-isobutylene according to our process at a temperature of 210° C. and a pressure of 25 pounds per square inch. A di-isobutylene charging period of 46 minutes was used. It may be seen from curve B that the amount of hydrogen sulfide formed in the reaction increases rapidly until about 60 minutes after the start of the charging period. At this point the rate of increase of hydrogen sulfide formation breaks sharply and from that point onward only a small additional amount of hydrogen sulfide is formed. Curves A and B are drawn on common axes to permit a convenient comparison of their results. It may be seen that the point of sharp decrease in hydrogen sulfide formation in curve B does not correspond with the point of substantially maximum yield of $C_8H_{12}S_3$ products in curve A. Thus, from the curves it may be concluded that the reaction should be permitted to continue for a considerable period after the sharp break in hydrogen sulfide formation occurs in order to obtain maximum yields.

With all of the above-mentioned factors in mind it can be concluded that the reaction should be continued for a period following the charging period and this reaction period should extend at least to the time at which the rate of formation of hydrogen sulfide becomes very slow if it is desired to obtain the highest yields of $C_8H_{12}S_3$ compounds. Preferably, this period should extend for a substantial period, for example from 5 to 60 minutes or more, after the rate of hydrogen sulfide formation becomes very slow. In a preferred embodiment of our process such as practiced in obtaining the data for curve A of Figure 2 and in the example below, the total time for the reaction including both the charging period and the reaction period thereafter is from about 90 to about 180 minutes. However, satisfactory results may be obtained using shorter or longer periods, depending on the various factors which we have discussed.

When the reaction is substantially complete, say 120 minutes after the end of a 30-minute di-isobutylene charging period, the crude reaction product is removed from the reactor and may be used for any purpose for which the crude product is suitable such as for adding to fuels or lubricants. However, it is frequently desirable to obtain the $C_8H_{12}S_3$ compounds in a more nearly pure condition. In such a case the crude reaction product can be subjected to purification procedures to obtain products such as a partially purified product, a purified mixture consisting essentially of the two isomers of $C_8H_{12}S_3$, or either of the pure compounds of $C_8H_{12}S_3$. Of these possible alternatives, the partially purified product is favored for many commercial usages as a compromise between the more expensive pure compounds and the crude reaction product containing unreacted sulfur.

To obtain the product which we call the partially purified product, the crude reaction product is treated with a suitable solvent to dissolve the desired $C_8H_{12}S_3$ compounds and leave behind unreacted sulfur and impurities. Among such solvents may be mentioned diethyl ether, chloroform, carbon tetrachloride, and benzene. The solution is filtered to remove the undissolved material and the filtrate is cooled to a temperature low enough to precipitate or crystallize the orange crystals of $C_8H_{12}S_3$. The $C_8H_{12}S_3$ compounds are considerably less soluble in paraffinic hydrocarbons than in the solvents mentioned above. Therefore, before cooling the solution, it is preferable to add a paraffinic hydrocarbon, e. g. pentane, butane, hexane, isopentane, etc., to the solution to lower the solubility of the $C_8H_{12}S_3$ compounds. They can then be precipitated at a somewhat higher temperature than if the paraffinic hydrocarbon is not added. The partially purified product so obtained usually has a melting range of between about 40° and 55° C.

The yields of $C_8H_{12}S_3$ recorded in the tables and elsewhere in subsequent portions of this specification refer to the weight of the partially purified product obtained in the manner described. The percentage yields of $C_8H_{12}S_3$ are calculated using the weight obtained of the partially purified product and the weight of $C_8H_{12}S_3$ which is theoretically expected to be obtained on the basis of the amount of sulfur charged in the process.

The partially purified product can be used in many ways, for example as a cutting oil additive, a cetane-number improver, a chemical intermediate for the production of acids, etc. However if a highly purified product is needed, the partially purified product can be further purified as by washing and recrystallization to obtain a mixture consisting essentially of the two isomers of $C_8H_{12}S_3$ having melting points of 80° C. and 87° C., respectively. This purified mixture, which melts in a temperature range of between about 50° and 70° C., has many uses similar to those of the partially purified product, and is especially advantageous where purity is important. For many purposes the mixture may be employed in lieu of either of the pure compounds alone and in some instances it may even be preferred, as for example when used as an additive in certain petroleum fuels. However, when it is desired to obtain the pure isomers, they may be separated by taking advantage of their differences in solubility. The higher melting isomer is slightly less soluble in most organic solvents than the low-melting compound, and accordingly it may be isolated by repeated crystallizations from organic solutions while the low-melting compound is recovered from the mother liquor. Chloroform is an example of a solvent having superior differential solvent power for the two isomers.

One specific embodiment of our invention is described in the following example:

EXAMPLE

The sulfurization of di-isobutylene was carried out in an 1830 milliliter lead-lined autoclave which was provided with inlet and outlet lines similarly as shown in Figure 1 of the drawing. The autoclave was charged with 160 grams of sulfur (5 gram-mols). The sulfur was heated to 210° C. and maintained at that temperature while pumping liquid di-isobutylene into the autoclave near the bottom thereof below the surface of the molten sulfur. 118 grams of di-isobutylene (1.05 gram-mols) were charged to the autoclave over a period of 30 minutes. The pressure in the autoclave was allowed to build up to 60 pounds per square inch and was maintained at that level by releasing hydrogen sulfide at a regulated rate through a pressure-control valve in the hydrogen sulfide outlet line. The reactants were maintained in the autoclave at the temperature of 210° C. and the pressure of 60 pounds per square inch for 120 minutes beyond the initial 30-minute period of charging di-isobutylene. The hydrogen sulfide formed in the reaction beyond that necessary to maintain the desired pressure was vented to the atmosphere. A small amount of di-isobutylene carried out of the autoclave with the hydrogen sulfide was condensed and recycled to the di-isobutylene supply. At the end of the reaction period the crude reaction product consisting of a brownish-orange colored, almost solid mass was removed from the autoclave. This product was valuable for addition to mineral oils to form cutting oils. In the present example, it was desired to obtain the partially purified $C_8H_{12}S_3$ compounds and therefore the crude product was treated with about 0.75 liter of diethyl ether. This extraction treatment dissolved out all of the $C_8H_{12}S_3$ and left behind the unreacted sulfur. The sulfur was filtered off and to the filtrate was added about 0.75 liter of pentane. The resulting mixture was then cooled in dry ice and acetone to $-70°$ C. whereupon the $C_8H_{12}S_3$ separated out as orange crystals which were filtered, washed twice with a cold $(-70°$ C.) pentane-ether solution, and dried. The product thus obtained comprised a mixture of the 80° C. melting point and the 87° C. melting point isomers of $C_8H_{12}S_3$ and had a melting range of between about 50° and 55° C. The yield was 79.2 per cent based on the amount of sulfur charged. 7.5 grams of unreacted sulfur was found.

In the above example, we have described an embodiment of our process in which certain specific amounts of materials were used. If it is desired to operate the process on a larger scale, larger amounts of the materials may be used and preferably in proportions similar to those used in the example.

We have conducted comparative tests to show the advantages of our new procedure over the closed vessel method of performing these sulfurization reactions. The sulfurization of di-isobutylene was conducted by the closed vessel method of operation and also by our process at temperatures of 210° C. and 180° C. By the prior method the reaction was carried out in a closed vessel, retaining within the vessel hydrogen sulfide formed in the reaction. Autogenic pressures of 175 pounds per square inch for the 210° C. run and 79 pounds per square inch for the 180° C. run were obtained in using the prior method. A pressure of 25 pounds per square inch for the 210° C. run and 50 pounds per square inch for the 180° C. run were employed when operating according to our process. Table I below records the operating conditions and the results of the tests:

*Table I*

| Run No. | Temp., °C. | Pressure, p. s. i. g. | Time, mins.[1] | Weight of $C_8H_{12}S_3$, gms. | Yield of $C_8H_{12}S_3$, percent | Remarks |
|---|---|---|---|---|---|---|
| 1 | 210 | 175 | 240 | 93.5 | 45.8 | Prior process. |
| 2 | 210 | 25 | 240 | 156.5 | 76.6 | Our process. |
| 3 | 180 | 79 | 30 | 33.3 | 16.3 | Prior process. |
| 4 | 180 | 50 | 30 | 54.3 | 27.0 | Our process. |

[1] The times listed do not include the initial 30-minute period during which di-isobutylene was charged to the reactor.

From the above table it can be seen that the yield of $C_8H_{12}S_3$ was markedly higher when the reaction was carried out in the manner of the present invention for both temperatures studied.

It may be noted in Table I that the yields in both run 3 (prior method) and run 4 (our method) were considerably lower than the yields in either run 1 or run 2. The low yields in runs 3 and 4 are due to the shortness of the reaction period which was only 30 minutes beyond the charging period and to the lower temperatures employed as indicated in the table. The significant thing to observe about these two runs is that although both runs produced low yields because of the short reaction periods and lower temperatures, run 4, conducted according to our process, produced a considerably higher yield than run 3 conducted according to the prior process.

The reaction temperature is an important variable of the present process, and we have discovered that an optimum temperature of between about 200° and 230° C. should be used in combination with the optimum pressure and operating features of the process. Table II below records the results of tests which show the advantages obtained when using a reaction temperature of about 210° C. In these tests di-isobutylene was sulfurized at different temperatures while the other operating variables of the process were maintained substantially constant. The procedure in the tests was substantially the same as described in the example above and the results are as follows:

*Table II*

| Run No. | Temp., °C. | Pressure, p. s. i. g. | Time, mins.[1] | Weight of $C_8H_{12}S_3$, gms. | Yield of $C_8H_{12}S_3$, percent |
|---|---|---|---|---|---|
| 5 | 180 | 55 | 240 | 65.4 | 32.0 |
| 6 | 210 | 60 | 120 | 161.7 | 79.2 |
| 7 | 240 | 60 | 120 | 141.8 | [2] 69.5 |

[1] The times listed do not include the 30-minute di-isobutylene charging period.
[2] The crude reaction product was of poor quality, being tar-like, although somewhat crystalline. The recovered $C_8H_{12}S_3$ (i. e. the partially purified product) was very dark in color instead of the desired light orange color.

From the results in Table II it can be seen that a temperature of about 210° C. produces a higher yield and purer quality of the desired $C_8H_{12}S_3$ (in the form of the partially purified product) than do the temperatures above and below this point. The preferred temperature range for our process is between about 200° and 230° C.

The reaction pressure also is an important variable in our process. It must be high enough to keep di-isobutylene in the liquid state but must be low enough to prevent appreciable solubility of hydrogen sulfide in the reaction mass. We have discovered that an optimum range for pressure of from about 25 to 120 pounds per square inch exists for the process. Both below and above this optimum range the yield of $C_8H_{12}S_3$ decreases. Furthermore, the product obtained when operating with pressures below the optimum range is of a poor and impure quality. We have conducted tests for reacting sulfur and di-isobutylene according to our process over a range of reaction pressures. The temperature for each test run was 210° C. and the reaction time 240 minutes after an initial charging period of 30 minutes. Di-isobutylene was charged in the amount of 1.05 mols per 5 mols of sulfur. The results of these tests are recorded in Table III below.

*Table III*

| Run No. | Pressure, p. s. i. g. | Weight of $C_8H_{12}S_3$, gms. | Yield of $C_8H_{12}S_3$, percent |
|---|---|---|---|
| 8 | 0 | 131.8 | [1] 64.4 |
| 9 | 10 | 113.2 | [1] 55.4 |
| 10 | 25 | 156.5 | 76.6 |
| 11 | 60 | 163.5 | 80.1 |
| 12 | 120 | 140.8 | 68.9 |
| 13 | [2] 175 | 93.5 | 45.7 |

[1] Crude reaction product was tarry. Recovered $C_8H_{12}S_3$ (i. e., the partially purified product) was dark in color. The apparent high yield for Run No. 8 was due to inclusion of some tarry matter in the partially purified product weighed. When this product was recrystallized the yield dropped to 51.7%. The product was still dark.
[2] $H_2S$ was held in the reaction vessel throughout the run.

From Table III it can be seen that the highest yield and purest quality of the desired $C_8H_{12}S_3$ product (in the form of the partially purified product) are obtained within the range of 25 to 120 pounds per square inch and preferably at about 60 pounds per square inch. This achievement of both a purer quality and a greater yield of desired product when operating at the specified pressures is an unexpected beneficial result of our invention.

In the foregoing description our process has been described as a batch-wise operation using equipment of the kind shown in Figure 1 of the drawings. However, it should be understood that our process is applicable also to continuous operation and can be performed in a continuous manner using equipment of the kind shown in Figure 3 of the drawing. The explanation of continuous operation of our process will be made by referring to Figure 3, in which is shown a reaction vessel 17 of structure similar to the reaction vessel 1 of Figure 1. Reaction vessel 17 is provided with a charge inlet 18, a stirrer 19, an inert gas inlet line 20, a thermowell 21 containing suitable temperature measuring means, and a hydrogen sulfide release line 22 having a condenser 23, a pressure gauge 24, and a hydrogen sulfide release valve 25. Extending horizontally from the side of reaction vessel 17 is a product take-off line 26. Line 26 draws off liquid product from vessel 17 in such a way as to avoid loss of gas from the system and consequent pressure drop. One way in which this can be accomplished is shown in the drawing. Line 26 leads into the top of a closed tank 27 having a liquid outlet 28 in its bottom. The liquid outlet is provided with a liquid level operated valve 29. Liquid product from reaction vessel 17 overflows from line 26 into the tank 27 and rises to a predetermined level in the tank. When the level of liquid exceeds the predetermined level, valve 29 in the bottom of tank 27 opens to release liquid and as the level drops, valve 29 closes until the level again builds up. The gas space above the liquid level is connected by a line 30 to the gas space in reaction vessel 17 so that the pressure in reaction vessel 17 and in tank 27 will be the same. With such an arrangement, there is a gas seal formed in tank 27 so that only liquid is withdrawn and no pressure is lost in the reaction system.

To operate our process continuously, the procedure is as follows: A charge slurry is prepared from liquid di-isobutylene and sulfur with the amount of di-isobutylene being slightly in excess of the stoichiometric amount of one mol per five mols of sulfur. This slurry is charged to reaction vessel 17 up to the level of the product take-off line. The desired reaction temperature of between about 200° and 230° C. is maintained in the reaction vessel by heaters, not shown. When the reaction temperature is imposed on the mixture of di-isobutylene and sulfur, reaction takes place with the evolution of hydrogen sulfide which is released through the hydrogen sulfide release line at a rate such that the desired pressure of between about 25 and 120 pounds per square inch is maintained in the reaction vessel. The slurry of di-isobutylene and sulfur is charged continuously to the reaction vessel beneath the level of the liquid reaction mass in the vessel so that contact of di-isobutylene with hydrogen sulfide is minimized.

The charge rate of the di-isobutylene-sulfur slurry (which is substantially equal to the product take-off rate) is regulated so as to give an average residence time for the individual molecules within the reactor equal to the desired length of the reaction period. The preferred length of the reaction period in our continuous operation as in batch operation is between about 90 and 180 minutes although shorter or longer periods can be used. To express the preferred length of the reaction period in terms of charge rate, the volume of reaction mass maintained in the reaction vessel (i. e. the volume of the reaction vessel up to the product take-off line) can be called a "reaction mass volume." Then if one reaction mass volume of charge is introduced and one reaction mass volume of product is removed per hour, the length of the reaction period is one hour and the charge rate is "one reaction mass volume per hour." Thus for the preferred reaction period length of between about 90 and 180 minutes or 1.5 and 3.0 hours, the charge rate is between about ⅔ and ⅓ reaction mass volumes per hour. This is the preferred charge rate although a faster or slower charge rate can be used if for any reason it is desired to shorten or lengthen the reaction period. As a specific illustration we will consider the case of a reaction vessel having a capacity up to the level of the product take-off line, or in other words a reaction mass volume, of 50 gallons. A charge rate of 50 gallons per hour or one reaction mass volume per hour would correspond to a reaction period in batch operation of 60 minutes. A charge rate of 25 gallons per hour or ½ reaction mass volume per hour would correspond to a batch method reaction period of 120 minutes.

In carrying out the sulfurization of di-isobutylene by our process, an excess of the di-isobutylene above the stoichiometric amount should be used. A considerable increase in yield of sulfurized product over the yield obtained when using stoichiometric proportions is obtained when a slight excess of the di-isobutylene is present, but there is no advantage in having more than about 5 per cent excess.

Our process has been described in its non-catalytic embodiment but it is also within the scope of our invention to employ any suitable catalyst for sulfurization, as for example amines such as anisidine, benzyl paraphenetidiene, and their hydrosulfides, or the crude sulfurization reaction product itself may act as a catalyst.

The process of our invention may employ either of the isomers of di-isobutylene, namely 2,4,4-trimethylpentene-1 or 2,4,4-trimethylpentene-2. The same $C_8H_{12}S_3$ product is obtained when using either one of these compounds in the process of our invention.

In describing the process of our invention we have distinguished it from the prior closed vessel method of sulfurizing di-isobutylene. For most practical purposes it is proper to distinguish our process and the prior process on the ground that the prior process is conducted in a closed vessel. However, it should be understood that this distinction is based on a fundamental difference in the two process in that the prior process is conducted in such a manner that hydrogen sulfide is retained in the closed vessel in contact with the reaction mass while our process is conducted with removal of hydrogen sulfide from contact with the reaction mass substantially as rapidly as formed. Thus it is conceivable that our process in its broad embodiments might be conducted in a closed vessel if such vessel had a great volume of space above the reaction mass so that hydrogen sulfide formed in the reaction could readily escape from the reaction mass into the space above without being released from the closed vessel. If the volume of the closed vessel, the pressure in the closed vessel, and the amount of reactants were of such proportions as to result in substantially the same release of hydrogen sulfide from contact with the reactants as we accomplish when using equipment of conventional size by releasing hydrogen sulfide from the vessel, the performance of the process in such a closed vessel would be within the contemplation of our invention and the scope of our claims.

From the description of our invention it can be seen that our process provides much higher yields of desired products as compared with the prior closed-vessel method of conducting these reactions. Our yields range up to about 80 per cent based on the amount of sulfur charged. In addition our process avoids the production of substantial amounts of undesirable by-products such as the mercaptans, disulfides, and polysulfides. Still further, our process permits a di-isobutylene-sulfur ratio not far from stoichiometrical and thus permits considerable savings in di-isobutylene. Still further, our process operates at relatively low pressures so that expensive heavy equipment is not required. To all of these advantages can be added the fact that our process produces the desired products in high purity.

We claim:

1. In a process for sulfurizing di-isobutylene by reacting di-isobutylene with molten sulfur, the improvement which comprises charging di-isobutylene beneath the surface of a liquid reaction mass comprising molten sulfur while maintaining the reaction mass at a temperature of between about 200° and 230° C. and a pressure of between about 25 and 120 pounds per square inch, and while removing hydrogen sulfide formed in the resulting reaction from contact with the reaction mass substantially as rapidly as formed.

2. In a process for sulfurizing di-isobutylene by reacting di-isobutylene with molten sulfur, the improvement which comprises charging di-isobutylene beneath the surface of a liquid reaction mass comprising molten sulfur over a charging period of sufficient length to avoid vaporizing the di-isobutylene from the reaction mass while maintaining the reaction mass at a temperature of between about 200° and 230° C. and a pressure of between about 25 and 120 pounds per square inch, while removing hydrogen sulfide formed in the resulting reaction from contact with the reaction mass substantially as rapidly as formed, and maintaining the reaction mass under the reaction conditions for a substantial period after the rate of formation of hydrogen sulfide becomes very slow.

3. In a process for preparing compounds having the emperical formula $C_8H_{12}S_3$ by reacting di-isobutylene with molten sulfur, the improvement which comprises charging di-isobutylene into a reaction vessel beneath the surface of a liquid reaction mass comprising molten sulfur, in an amount of about 1 mol of di-isobutylene per 5 mols of sulfur, while maintaining a temperature of between about 200° and 230° C. and a pressure of between about 25 and 120 pounds per square inch in said vessel, and while removing hydrogen sulfide formed in the resulting reaction from said vessel substantially as rapidly as formed, maintaining said di-isobutylene and said sulfur within said vessel under the reaction conditions for a period of at least about 90 minutes including the time required for charging the di-isobutylene, and thereafter treating the crude reaction product with a solvent to separate the $C_8H_{12}S_3$ compounds from unreacted reactants and impurities.

4. In a process for preparing compounds having the empirical formula $C_8H_{12}S_3$ by reacting di-isobutylene with molten sulfur, the improvement which comprises charging di-isobutylene into a reaction vessel beneath the surface of a liquid reaction mass comprising molten sulfur, in an amount of slightly more than one mol of di-isobutylene per 5 mols of sulfur, while maintaining a temperature of between about 200° and 230° C. and a pressure of between about 25 and 120 pounds per square inch in said vessel, and while removing hydrogen sulfide formed in the resulting reaction from said vessel substantially as rapidly as formed, and at the same time passing an inert gas through the reaction mass to aid in hydrogen sulfide removal and to provide a partial pressure of inert gas in the reaction vessel, maintaining said di-isobutylene and said sulfur within said vessel under the reaction conditions for a period of at least about 90 minutes including the time required for charging the di-isobutylene, and thereafter treating the crude reaction product with a solvent to separate the $C_8H_{12}S_3$ compounds from unreacted reactants and impurities.

5. In a process for sulfurizing di-isobutylene by reacting di-isobutylene with molten sulfur, the improvement which comprises continuously charging di-isobutylene as a liquid in admixture with sulfur beneath the surface of a liquid reaction mass comprising molten sulfur while maintaining a temperature of between about 200° and 230° C. and a pressure of between about 25 and 120 pounds per square inch in said vessel, and while removing hydrogen sulfide formed in the resulting reaction from said vessel substantially as rapidly as formed, and continuously removing crude reaction product from said vessel at a rate equal to the rate of charging di-isobutylene and sulfur to said vessel.

6. In a process for preparing compounds having the empirical formula $C_8H_{12}S_3$ by reacting di-isobutylene with molten sulfur, the improvement which comprises charging said di-isobutylene as a liquid in admixture with sulfur in a ratio of slightly more than one mol of di-isobutylene per 5 mols of sulfur beneath the surface of a liquid reaction mass comprising molten sulfur, said mixture being charged to said vessel at a rate of between about ⅔ and ⅓ reaction mass volumes per hour, said charging being carried out while maintaining a temperature of between about 200° and 230° C. and a pressure between about 25 and 125 pounds per square inch in said vessel and while removing hydrogen sulfide formed in the resulting reaction from said vessel substantially as rapidly as formed, continuously removing crude reaction product from said vessel at a rate equal to the rate of charging di-isobutylene and sulfur to said vessel, and thereafter treating the crude reaction product with a solvent to separate the $C_8H_{12}S_3$ compounds from unreacted reactants and impurities.

DONALD R. STEVENS.
SAMUEL C. CAMP.

References Cited in the file of this patent

UNITED STATES PATENTS

| Number | Name | Date |
|---|---|---|
| 2,450,658 | Hansford et al. | Oct. 5, 1948 |
| 2,535,705 | Stevens et al. | Dec. 26, 1950 |
| 2,535,706 | Stevens et al. | Dec. 26, 1950 |

OTHER REFERENCES

Shepard et al.: J. Am. Chem. Soc., vol. 56, pp. 1355–6 (1934).